(12) United States Patent
Bobuk

(10) Patent No.: US 11,340,476 B1
(45) Date of Patent: May 24, 2022

(54) HINGE MECHANISM FOR ROUTING ENERGY WAVEGUIDES

(71) Applicant: Facebook Technologies, LLC, Menlo Park, CA (US)

(72) Inventor: Aaron Bobuk, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 828 days.

(21) Appl. No.: 16/222,315

(22) Filed: Dec. 17, 2018

(51) Int. Cl.
| | |
|---|---|
| *G02B 27/01* | (2006.01) |
| *G02C 5/22* | (2006.01) |
| *G06F 1/16* | (2006.01) |
| *H01P 3/06* | (2006.01) |
| *F21V 8/00* | (2006.01) |
| *G02C 11/00* | (2006.01) |
| *H01P 1/02* | (2006.01) |

(52) U.S. Cl.
CPC ............. *G02C 5/22* (2013.01); *G02B 6/0005* (2013.01); *G02B 27/0176* (2013.01); *G02C 11/10* (2013.01); *G06F 1/163* (2013.01); *G06F 1/1616* (2013.01); *G06F 1/1683* (2013.01); *H01P 1/02* (2013.01); *H01P 3/06* (2013.01); *G02B 2027/0178* (2013.01)

(58) Field of Classification Search
CPC . G02C 5/22; G02C 11/10; G02C 9/00; G02C 9/02; G02C 9/04; G02C 5/2209; G02C 5/2227; G02C 5/2236; G02C 5/2254; G02C 5/2263; G02C 5/2272; G02C 5/2281; G02C 5/229; G02B 6/0005; G02B 27/0176; G02B 2027/0178; G06F 1/1616; G06F 1/163; G06F 1/1683; G06F 1/1681; H01P 1/02; H01P 3/06
See application file for complete search history.

(56) References Cited

U.S. PATENT DOCUMENTS

2014/0333890 A1\* 11/2014 Xia .................. G02C 11/10
351/158

\* cited by examiner

*Primary Examiner* — James C. Jones
(74) *Attorney, Agent, or Firm* — Fenwick & West LLP

(57) ABSTRACT

A hinge assembly for an electronic device. The hinge assembly includes a first component coupled to a second component by a cam. The cam includes a cylinder coupled to the first component and a bottom cap coupled to the second component by a fastener. The cylinder includes a first port and a second port, where an energy waveguide passes from the first component into the first port and through the second port into the second component. The first component rotates about an axis of rotation in relation to the second component from a first rotational position to a second rotational position. The first component is offset relative to the second component in the second rotational position. The offset includes a translation along an axis parallel to an axis of rotation and a rotation about the axis of rotation.

20 Claims, 9 Drawing Sheets

Eyeglasses 100

HINGE MECHANISM FOR ROUTING ENERGY WAVEGUIDES

BACKGROUND

The subject matter described generally relates to hinge mechanisms, and specifically to hinge mechanisms that route energy waveguides.

Electronic devices such as phones, laptops, and watches generally include a wire for transmitting signals from one electronic system to another. Many of these types of devices may include one or more components (e.g., a screen and a keyboard) coupled by a hinge mechanism. In order to couple the electronic portions of the components (e.g., a battery and a display system), a wire may be routed through the hinge. Current hinge mechanisms, such as those found in eyeglasses, are not well suited to route wires. Hinge mechanisms in eyeglasses are generally very small, and these types of hinge mechanisms may cause a wire to be exposed, to stretch, and to bend tightly during use. This can negatively impact the lifetime of a wire and the quality of signal transmission between electronic components.

SUMMARY

Embodiments relate to a hinge assembly for routing an energy waveguide through one or more components of a device (e.g., set of eyeglasses, computer, phone, etc.). The hinge assembly includes a first component coupled to a second component. The hinge mechanism including an axis of rotation about which the first component rotates relative to the second component. The hinge mechanism comprises a cam coupled to the first component. The cam includes a first port and a second port, and the relative position of the first port to the second port translates parallel to the axis of rotation as the first port rotates relative to the second port about the axis of rotation. And an energy waveguide (e.g., one or more wires, one or more optical fibers, etc.) passes through the first component into the first port and out of the second port into the second component.

In some embodiments, the hinge mechanism is a component of an eyeglass assembly. The eyeglass assembly includes a frame holding at least one optical element, at least one temple arm, and the hinge mechanism couples the temple arm to the frame. A cam coupled to the temple arm, and the cam includes a first port and a second port, and a relative position of the first port to the second port translates parallel to an axis of rotation as the first port rotates relative to the second port about the axis of rotation. And a wire passes through the temple arm into the first port and out of the second port into the front frame.

Figure 1A:
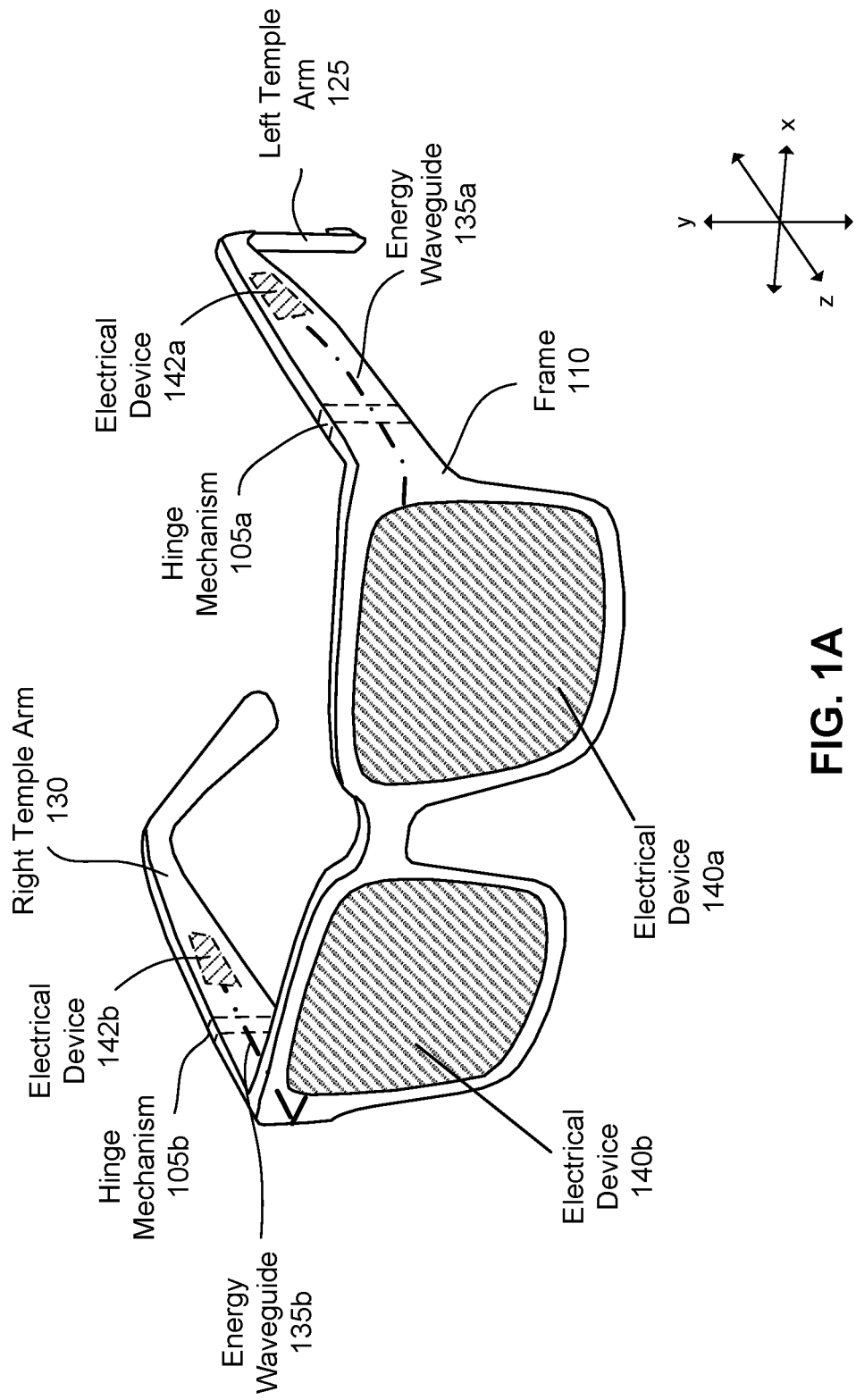
FIG. 1A is a schematic of a set of eyeglasses, according to one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A hinged electronic device (e.g., headset, mobile phone, laptop, etc.), also referred to as an electronic device, includes a first component and a second component coupled by a hinge mechanism. The first component and the second component can include electrical devices (e.g., a battery, a speaker, a printed circuit board, display, etc.) that are communicatively coupled via an energy waveguide (e.g., wire, optical fiber, etc.). The energy waveguide may pass information and/or power between the electrical subsystems. The energy waveguide passes from the first component through the hinge mechanism into the second component. The hinge mechanism controls the path of the energy waveguide as the first component rotates relative to the second component about an axis of rotation. As the first component rotates, it causes translational motion such that the first component is offset from the second component along an axis parallel to the axis of rotation. The hinge mechanism allows the energy waveguide to maintain a consistent path as the first component rotates, preventing the energy waveguide from bending or twisting in undesired directions, preserving the lifetime and functionality of the energy waveguide.

In some embodiments, the hinged electronic device is a set of eyeglasses, the first component is a temple arm, and the second component is a frame. The frame includes a first electrical device, which can be a display element. The temple arm includes a second electrical device, such as a battery, coupled to the first electrical device by the energy waveguide. The energy waveguide can be, e.g., an optical fiber, a micro coax (MCX) cable, one or more conductive wires, some other waveguide that communicatively couples electronic devices, or some combination thereof.

Various embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a schematic of a set of eyeglasses 100 including hinge mechanism 105a and hinge mechanism 105b, according to one or more embodiments. The eyeglasses 100 include a frame 110, a left temple arm 125, a right temple arm 130, energy waveguides 135a and 135b, electrical devices 140a and 140b, electrical devices 142a and 142b, and at least one hinge mechanism (e.g., 105a, 105b). Hinge mechanism 105a is substantially the same as hinge mechanism 105b, except the hinge mechanisms are configured to couple different temple arms to the frame 110 (and, as discussed below, opposite directions of rotation of the hinge mechanisms 105a, 105b result in a same direction of translation between the temple arms and the frame 110). As such mechanism 105b is a mirror of hinge mechanism 105a. The eyeglasses 100 may be part of an artificial reality system.

An electrical device is a device or component of a device that receives and/or uses electricity. An electrical device may be, e.g., a battery, a printed circuit board, a display element (e.g., waveguide display), a speaker, a microphone, a position sensor (e.g., an inertial measurement unit (IMU)), a light source (e.g., a light emitting diode), some other device or component of a device that receives and/or uses electricity, or some combination thereof. For example, in FIG. 1A, the eyeglasses 100 include electrical devices 140a, 140b and the electrical devices 142a, 142b. The electrical devices 140a, 140b are display elements and the electrical devices 142a, 142b are batteries that power the display elements. Note, while the electrical devices 142a, 142b are the same in the illustrated embodiment, in other embodiments they may be different (e.g., a battery and a IMU). Electrical devices may be communicatively coupled, using one or more energy waveguides, to other electrical devices coupled to and/or part of the left temple arm 125, the right temple arm 130, the frame 110, or some combination thereof.

The energy waveguides 135a, 135b communicatively couple electrical devices. For example, the electrical device 140a is communicatively coupled to the electrical device 142a using the energy waveguide 135a, and the electrical device 140b is communicatively coupled to the electrical device 142b using the energy waveguide 135b. Communicative coupling, as used herein, refers to communication of information to and/or providing power to an electrical device. The energy waveguide may be, e.g., a micro coax (MCX) cable, an electrical conductor (e.g., one or more conductive wires), an optical fiber, some other energy waveguide that communicatively couples electronic devices, or some combination thereof. As described below in relation to FIG. 1A, the energy waveguide 135a passes through the hinge mechanism 105a to communicatively couple electrical devices, and the energy waveguide 135b passes through the hinge mechanism 105b to communicatively couple electrical devices. In the illustrated embodiment, the energy waveguides 135a, 135b pass within an interior of the frame 110 and their respective temple arms. In alternate embodiments, an energy waveguide may be routed along an exterior surface of the frame 110 and/or one or both temple arms.

The frame 110 provides structural support for the eyeglasses 100. A front part of the frame 110, shown in the x-y plane where the z-axis is coming out of the page, is designed to bridge a top of a nose of a user, and sides of the frame are respectively coupled to the left temple arm 125 and the right temple arm 130. In the illustrated embodiment, the frame 110 includes the electronic devices 140a, 140b. In alternate embodiments, the frame 110 includes different and/or additional electronic devices (e.g., an IMU). The frame 110 may be composed of plastic, metal, some other material, or some combination thereof.

In some embodiments, the frame 110 includes at least one electrical device. The electronic device may be fully within an interior of the frame 110 (e.g., within a chamber inside the frame 110) or partially exposed to a local area outside of the frame 110. In the illustrated embodiment, the energy waveguide 135a is routed through the hinge mechanism 105a such that the electrical device 140a in the frame 110 can be coupled to the electrical device 142a in the left temple arm 125. Likewise, the energy waveguide 135b is routed through the hinge mechanism 105b such that the electrical device 140b in the frame 110 can be coupled to the electrical device 142b in the right temple arm 130. The frame 110 is composed of a material suitable for supporting the electrical devices 140a, 140b and facilitating signal transmission between the electrical devices 140a, 140b and the electrical devices 142a, 142b. In alternate embodiments (not shown), the frame 110 does not include an electrical device, but is traversed by one or more energy waveguides that communicatively couples electronic devices in the left temple arm 125 and the right temple arm 130. For example, the eyeglasses 100 may, optically, be a normal pair of glasses, but have an on-board audio system.

The temple arms (e.g., the left temple arm 125, the right temple arm 130) are configured to retain the eyeglasses 100 on a user's head. An end region of a temple arm (e.g., the left temple arm 125, the right temple arm 130) is shaped such that it can comfortably interact with a user's ear. During use, the temple arms are configured to bend away from the frame 110 so that they can be positioned on a user's head above his/her ear. The size of a user's head can vary; thus, the temple arms may have different rotational positions for different users. For example, for a user with a head of average size, the temple arms may be parallel to the z-axis during use (i.e., at 0 degrees). For a user with a narrow or wide head, the temple arms may be rotated about an axis parallel to the y-axis −20 to 20 degrees so that they are suited to the size of a user's head. The temple arms can be angled in relation to an axis parallel to the z-axis during use. The temple arms are configured to bend toward the frame 110 by a hinge so that the eyeglasses 100 can be stored compactly when they are not in use. In one embodiment, the left temple arm 125 rotates from a position of −20 degrees in a coordinate system to a position of 120 degrees in the same coordinate system (i.e., a 140-degree range of rotation). The right temple arm 130 is substantially the same as the left temple arm 125 and has the same range of motion (i.e., a 140-degree range of rotation), but the right temple arm 130 rotates in an opposite direction to the left temple arm 125 (e.g., 20 degrees to −120 degrees). In the illustrated embodiment, the left temple arm 125 and the right temple are coupled to the frame 110 via the hinge mechanism 105a and the hinge mechanism 105b, respectively. In other embodiments, only one of the right temple arm 130 or the left template arm 125 is coupled to the frame 110 via a hinge mechanism (e.g., hinge mechanism 105a, hinge mechanism 105b).

A temple arm (e.g., 125 and/or 130) may include an electronic device. The electronic device may be fully within an interior of a temple arm (e.g., within a chamber inside the temple arm) or partially exposed to a local area outside of the temple arm (e.g., in a microphone). In the embodiment of FIG. 1A, the left temple arm 125 includes an electrical device 142a coupled to an energy waveguide 135a. The energy waveguide 135a is routed from the left temple arm 125 to the frame 110 through the hinge mechanism 105a. In the embodiment of FIG. 1A, the electrical device 140b is communicatively coupled with the electronic device 140a using the energy waveguide 135a. The right temple arm 130 also includes an electrical device 142b coupled to the electrical device using the energy waveguide 135b. Alternatively, both the right temple arm 130 and the left temple arm 125 can include one or more electrical devices that are coupled to the electrical devices 140a, 140b and/or some other electrical components in the frame 110. The left temple arm 125 and the right temple arm 130 may be composed of plastic, metal, some other material, or some combination thereof.

The hinge mechanism 105a guides the energy waveguide 135a as the left temple arm 125 moves from a first rotational position to a second rotational position. Likewise, the hinge mechanism 105b guides the energy waveguide 135b as the right template arm 130 moves from a first rotational position to a second rotational position. The components of the hinge mechanisms 105a, 105b are described in greater detail below in relation to FIGS. 3A-3C. In the embodiment of FIG. 1A, when the left temple arm 125 moves from a first rotational position to a second rotational position, the hinge mechanism 105a causes a translation of the left temple arm 125 along an axis parallel to an axis of rotation where the axis of rotation is parallel to the y-axis. Similarly, when the right temple arm 130 moves from a first rotational position to a second rotational position, the hinge mechanism 105b causes a translation of the right temple arm 130 along the axis parallel to an axis of rotation where the axis of rotation is parallel to the y-axis. In both cases, the rotation causes an offset (vertical translation along the axis of rotation) of the temple arm relative to the frame 110 which is described in greater detail below in relation to FIGS. 2A-2C. The offset of the left temple arm 125 and the right temple arm 130 allows the energy waveguides 135a, 135b to follow paths that do not subject the energy waveguides 135a, 135b to extensive bending or twisting. For example, as the left temple arm 125 rotates, the hinge mechanism 105a guides the energy waveguide 135a such that a minimum bend constraint is maintained.

The hinge mechanisms 105a, 105b included in the eyeglasses 100 combat the problems presented in current hinge mechanisms implemented in electronic devices, particularly for devices with small hinge mechanisms (e.g., eyeglasses 100). The hinge mechanism (e.g., 105a, 105b) is configured to consistently maintain the path length of an energy waveguide (e.g., 135a, 135b) and guide the energy waveguide such the energy waveguide is approximately tangent to a bend angle at an entrance and an exit of the hinge mechanism as a temple arm (e.g., 125, 130) moves from a first rotational position to a second rotational position. The hinge mechanism may increase the lifetime and preserve the function of an energy waveguide.

Note that in FIG. 1A the hinge mechanism 105a and the hinge mechanism 105b are used is in the context of the eyeglasses 100. But in alternate embodiments (not shown), the hinge mechanism 105a and/or the hinge mechanism 105b may be used in other hinged electronic devices. A hinged electronic device is an electronic device that includes two components that are coupled together via a hinge mechanism. A hinged electronic device may be, e.g., a laptop, a phone, a watch, a bracelet, a near eye-display, some other electronic device that includes two components that are coupled together via a hinge mechanism, etc. At least one of the coupled components includes an electronic device, and in some embodiments, both components that are coupled together via the hinge mechanism include a respective electronic device, and the respective electronic devices are communicatively coupled via an energy waveguide that passes through the hinge mechanism.

Figure 1B:
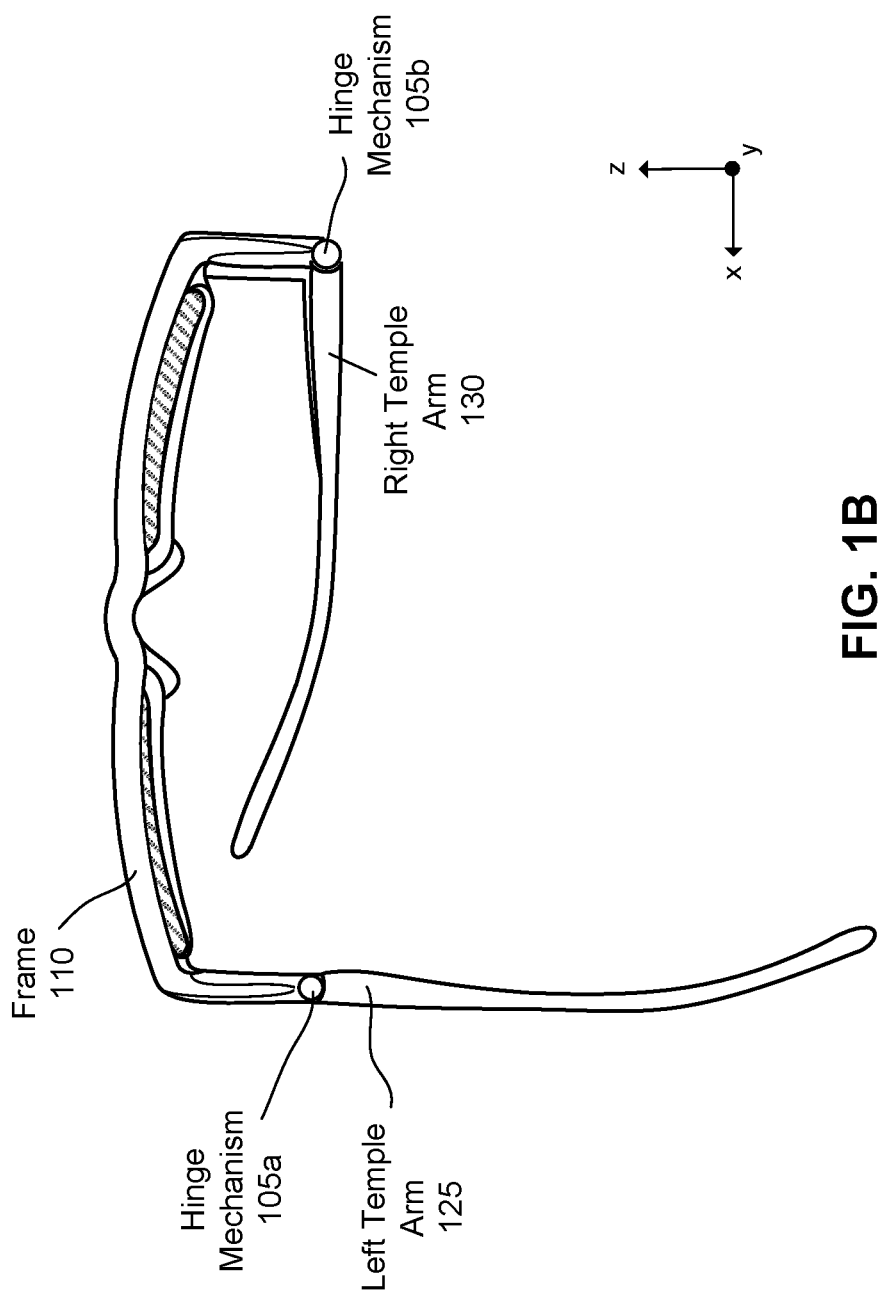
FIG. 1B is a top view of a set of eyeglasses, according to one or more embodiments.

FIG. 1B shows a top view of the eyeglasses 100, according to one or more embodiments. The eyeglasses 100 include a left temple arm 125 in a first rotational position and a right temple arm 130 in a second rotational position. The right temple arm 130 rotates about an axis of rotation relative to the frame 110. The hinge mechanism 105b functions to couple the components of the eyeglasses 100 while allowing for rotational and translational motion of the right temple arm 130 relative to an axis of rotation.

Figure 2A:
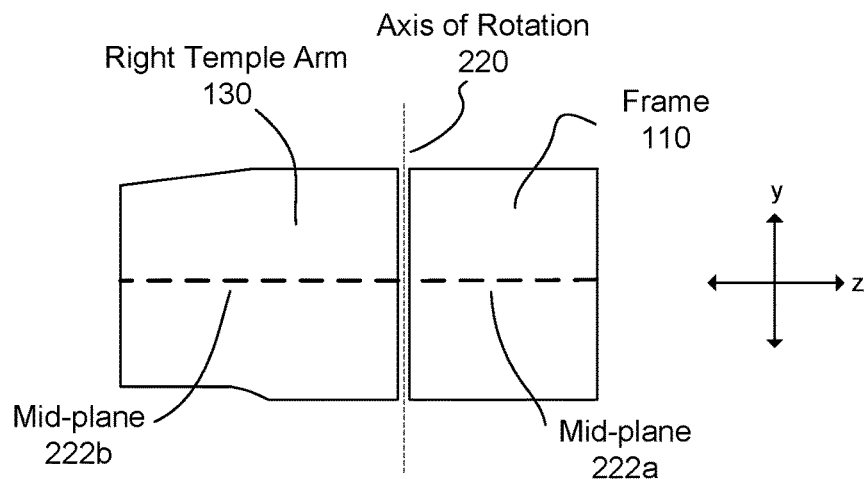
FIG. 2A is a side view of a portion of a headset in a first rotational position, according to one or more embodiments.

FIG. 2A is a side view of a portion of a headset 200 in a first rotational position, according to one or more embodiments. The headset 200 is substantially the same as the eyeglasses 100. In the embodiment of FIG. 2A, the side view of the portion of the headset 200 includes the right temple arm 130 coupled to the frame 110 via a hinge mechanism (e.g., the hinge mechanism 105b). The side view is shown in a z-y plane of a coordinate system of the frame 110 where the x-axis is extending into the page, such that the frame is fixed within the coordinate system and the right temple arm 130 moves within the coordinate system. The right temple arm 130 has a plurality of rotational positions about an axis of rotation 220, and each rotational position also has a different corresponding translational position. The plurality of rotational positions and corresponding translational positions may each be continuous. In FIG. 2A, the y-axis is parallel to the axis of rotation 220. As described below with reference to FIG. 2B, the right temple arm 130 rotates about the axis of rotation 220 and also translates in the negative y-direction. In alternative embodiments, the right temple arm 130 can translate in the positive y-direction. In the embodiment of FIG. 2A, a cross sectional mid-plane 222a of the frame 110 and a cross sectional mid-plane 222b of the right temple arm 130 relative to the axis of rotation 220 are co-planar. In a second rotational position, the cross sectional mid-plane 222a of the frame 110 and the cross sectional mid-plane 222b of the right temple arm 130 relative to the axis of rotation 220 are not co-planar, as described below in relation to FIG. 2B.

Figure 2B:
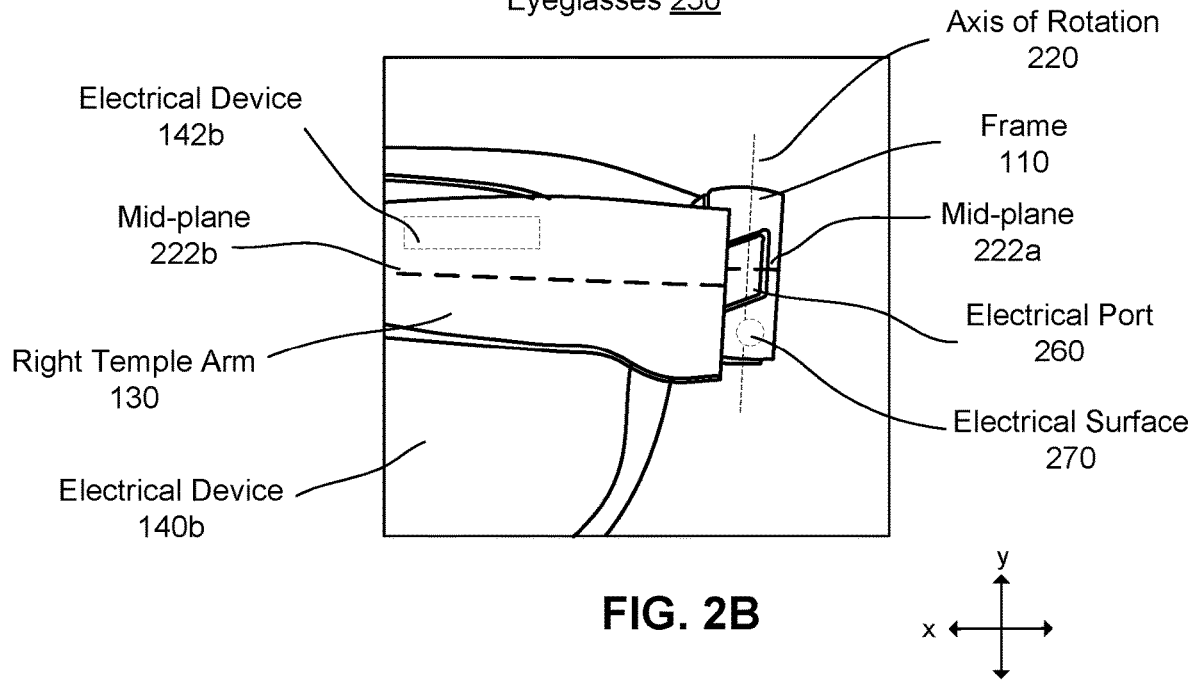
FIG. 2B is a portion of a back view of a set of eyeglasses, according to one or more embodiments

FIG. 2B is a portion of a back view of a set of eyeglasses 250 in a second rotational position, according to one or more embodiments. The eyeglasses 250 are substantially the same as the eyeglasses 100 with additional components. In the embodiment of FIG. 2B, the portion of the eyeglasses 250 is shown in an x-y plane where the z-axis is extending into the page. In the second rotational position, the right temple arm 130 is offset from the frame 110 along an axis parallel to the axis of rotation 220. In the embodiment of FIG. 2B, the right temple arm 130 translates in a negative y-direction. In the second rotational position, the cross sectional mid-plane 222a of the frame 110 and the cross sectional mid-plane 222b of the right temple arm 130 relative to the axis of rotation 220 are offset. The offset distance along an axis parallel to the axis of rotation 220, shown in FIG. 2B, can depend on a minimum bend radius of the right temple arm 130 described in greater detail below in relation to FIG. 5B. The offset distance is also related to the rotational position of the right temple arm 130. In some embodiments, the offset distance is nearly linear with the angle of rotation about the axis of rotation 220. For example, for an energy waveguide with a 4-millimeter diameter (e.g., a 2-millimeter bend radius), the offset is 0.052 millimeters per degree of rotation. In alternative embodiments, the offset is not linear with the angle of rotation (e.g., an energy waveguide has a small offset for 45 degrees of rotation and a large offset for 45-90 degrees of rotation). Note that deviating from the approximate linear relationship between the offset and the angle of rotation can result in decreased reliability of the hinge. In the embodiment of FIG. 2B, for an energy waveguide of with a 5-millimeter diameter, the offset in the rotational position shown (approximately 90 degrees) is 1.75 millimeters.

The eyeglasses 250 include an electrical port 260 and an electrical surface 270 shown in FIG. 2B. In the embodiment of FIG. 2B, the electrical port 260 and the electrical surface 270 are included in the frame 110. Alternatively, the electrical port 260 and/or the electrical surface 270 can be included in the right temple arm 130.

In the embodiment of FIG. 2B, the electrical port 260 functions as an electrical charging port to transmit power to an electrical device in the frame 110 and/or the right temple arm 130 from an external source (not shown). In the first rotational position, described above in relation to FIG. 2A, the electrical port 260 is hidden. In the second rotational position described by FIG. 2B, the electrical port 260 is exposed such that an external cable (e.g., a power cable) can be plugged into the electrical port 260. The external cable can deliver power to electrical device 140b or electrical device 142b through the electrical port 260. The external cable can be connected to a battery, a wall outlet, or some other device for providing power. Alternatively, the electrical port 260 can connect to an external component that transmits signals between an electrical device in the eyeglasses 250 and another device (e.g., a computer, a processor). For example, a data storage device may be included in the right temple arm 130 to store information from electrical device 140b. An external cable transmits information between the storage device and a computer via the electrical port 260.

The electrical surface 270 included in the set of eyeglasses 250 functions to communicatively couple an electrical component in the right temple arm 130 and an electrical component in the frame 110 in the first rotational position (described above in relation to FIG. 2A). In one embodiment, an energy waveguide includes an array of wires including one or more wires for transmitting power between electrical device 140b and electrical device 142b. In the embodiment of FIG. 2B, the electrical surface 270 is configured to transmit power between electrical device 142b in the right temple arm 130 and electrical device 140b in the frame 110. As such, the one or more wires for transmitting power can be removed from the energy waveguide, reducing the thickness of the energy waveguide. The reduced thickness can allow for a smaller minimum bend radius of the right temple arm 130 relative to the frame 110, improved performance of an energy waveguide, and/or increased lifetime of an energy waveguide. In the embodiment of FIG. 2B, the electrical surface 270 in an electrical charging region that transmits power between the electrical device 142b of the right temple arm 130 and electrical device 140b when right temple arm 130 is in a first rotational position. In the second rotational position shown in FIG. 2B, the electrical surface 270 is exposed and is coupled to the electrical device 140b in the frame 110 but is not coupled to the electrical device 142b in the right temple arm 130 (e.g., the electrical connection is broken). In another embodiment, the electrical surface 270 can interact with an interconnection component 460 described below in relation to FIG. 4A. Alternatively, the electrical surface 270 can be configured to have any suitable use (e.g., couple a speaker and a battery, couple a microphone and a printed circuit board). The electrical surface 270 can be composed of a conductive material configured to transmit signals between components.

Hinge Mechanism

Figure 3A:
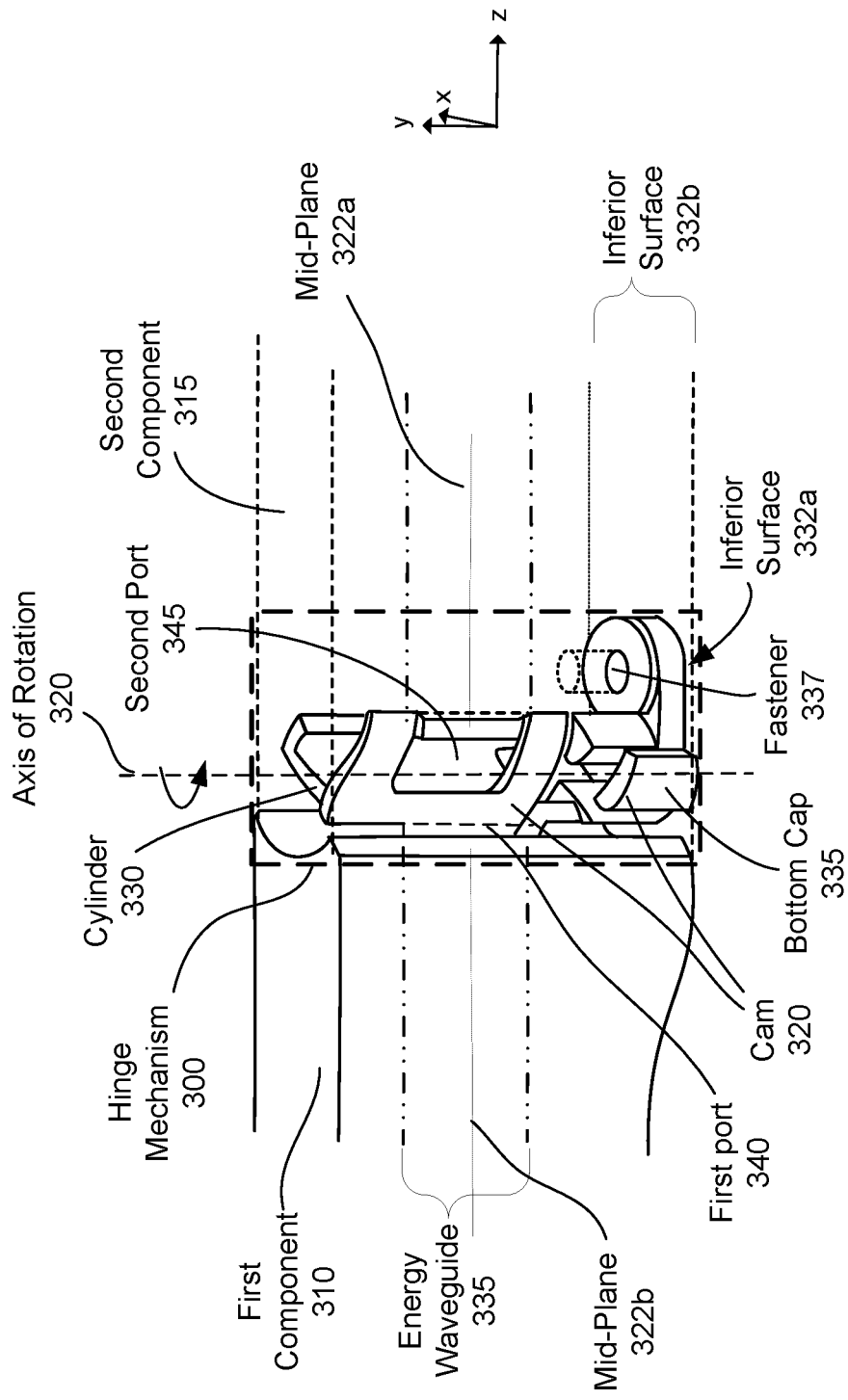
FIG. 3A is a first view of a portion of a hinged electronic device that includes a hinge mechanism in a first rotational position, according to one or more embodiments.

FIG. 3A shows a first view of a portion of a hinged electronic device that includes a hinge mechanism 300 in a first rotational position, according to one or more embodiments. The hinge mechanism 300 is substantially similar to the hinge mechanism 105a. The hinge mechanism 300 is part of a hinged electronic device (e.g., a set of eyeglasses, a laptop, a cell phone). The hinge mechanism 300 includes a cam 320 and mounting components to couple a first component 310 and a second component 315. Some embodiments of the hinge mechanism 300 have different components than those described here. Similarly, the functions can be distributed among the components in a different manner than is described here.

The cam 320 is configured to guide an energy waveguide 335 from the first component 310 to the second component 315. The cam 320 is configured to maintain the path length of an energy waveguide 335 and direct the energy waveguide 335 as the first component 310 rotates about the axis of rotation 320. The energy waveguide 335 is an embodiment of the energy waveguides discussed above with regard to FIG. 1A. FIG. 3A is an isometric view of the hinge mechanism 300 where the axis of rotation 320 is parallel with the y-axis and an inferior surface 332a of a bottom cap 335, described in greater detail below, is parallel with the x-z plane. In the embodiment of FIG. 3A, the first component 310 rotates about the axis of rotation 320 away from the page (e.g., the first component 310 rotates towards the reader). The first component 310 is offset from the second component along an axis parallel to the y-axis in a second rotational position. The cam 320 allows for both rotational and translational movement, preventing the energy waveguide 335 from extensive bending and preserving the function of the energy waveguide 335.

In the embodiment of FIG. 3A, the cam 320 includes a cylinder 330 and the bottom cap 335. The cylinder 330 includes a first port 340 and a second port 345. The ports (e.g., first port 340, second port 345) are apertures that are configured to guide the energy waveguide 335 as it passes through the cam 320. In the first rotational position, the first port 340 and the second port 345 are aligned such that the cross sectional mid-plane 322b of the first component 310 and the cross sectional mid-plane 322a of the second component 315 are co-planar, as described above in relation to FIG. 2A. The first port 340 has a constant cross section, described below in relation to FIG. 4B, while the height and width of the second port 345 are variable along a lateral surface of the cylinder 330 to direct the energy waveguide 335 along a three-dimensional path. The lateral surface of the cylinder 330 is parallel to the y-axis and the axis of rotation 320. FIG. 3A shows the energy waveguide 335 passing through the first port 340 and the second port 345 in the z-direction. As the first component 310 moves from the first rotational position to the second rotational position, the cylinder 330 rotates with the first component 310. The second port 345 of the cylinder 330 is thus rotated such that the energy waveguide has a new location along the x, y and z axes within the second port 345. The new location of the energy waveguide 335 in the second port 345 in the second rotational position is above the location of the energy waveguide 335 in the first rotational position in the second port 345 in relation to the lateral surface of the cylinder 330. The size and shape of the cylinder 330 are configured to prevent the energy waveguide 335 from exceeding the minimum bend radius. The cylinder 330 is at least partially hollow so that the energy waveguide 335 can pass through the first port 340 and the second port 345. In alternative embodiments, the ports (e.g., the first port 340, the second port 345) and the cylinder 330 can have any suitable shape and orientation for guiding the energy waveguide 335. For example, the first port 340 can have a circular cross section in order to guide an energy waveguide 335 with a circular diameter.

The cylinder 330 interacts with the bottom cap 335 of the cam 320 as described below in relation to FIG. 3C. The bottom cap 335 functions to couple the cylinder 330 and the second component 315. In one embodiment, such as in FIG. 3A, the inferior surface 332a of bottom cap 335 is flush with an inferior surface 332b of the second component 315 for user comfort. Alternatively, the bottom cap 335 can be recessed within or protruding from the inferior surface 332b of the second component 315. The bottom cap 335 is mounted to the second component 315 by a fastener 337. In the embodiment of FIG. 3A, the fastener 337 is a standard part (e.g., a screw, a pin, a nail) and is composed of a material that effectively supports the first component 310 and the second component 315 as the first component 310 rotates relative to the second component 315. In alternative embodiments, the fastener 337 can be any suitable material (e.g., an adhesive) or the bottom cap 335 can be coupled to the second component 315 without a fastener 337.

In relation to material composition, the cam 320, including the bottom cap 335 and the cylinder 330, can be composed of a single material or a composite material able to provide suitable physical properties for support of the assembly and rotational movement. The material of the cylinder 330 can be the same or different than the bottom cap 335. The material of the cylinder 330 and the bottom cap 335 can have a coefficient of friction such that an interlocking region 338b of the cylinder 330 can smoothly interact with an interlocking region 338a of the bottom cap 335 as described below in relation to FIG. 3C. The cam 320 may be composed of a metal such as stainless steel or aluminum. Alternatively, the cam 320 can be composed of any suitable material (e.g., ceramic, polymer, etc.).

In relation to mechanical properties, the material(s) of the cam 320 can have a compressive strength, a shear strength, a tensile strength, a strength in bending, an elastic modulus, a hardness, a derivative of the above mechanical properties and/or other properties such that the cam 320 can support the rotational motion of the first component 310 relative to the second component 315. In particular, transverse, longitudinal, and rotational forces will be exerted on or by the cam 320. The cam 320 can be composed of material such as a metal, a polymer, a ceramic, or a composite that can resist bending and/or breaking under various loading conditions.

In relation to electrical properties, the material(s) of the cam 320 can have a conductivity, resistivity, a derivative of the above electrical properties and/or other properties that supports signal transmission between the first component 310 and the second component 315. For instance, the cam 320 can be composed of an insulative material in order to prevent signal interference between the energy waveguide 335 and other components (e.g. first component 310, second component 315). Alternatively, a portion of the cam 320 can be composed of a conductive material and can function in addition to the energy waveguide 335 in order to support signal transmission from the first component 310 to the second component 315.

In the embodiment of FIG. 3A, the first component 310 may be a left temple arm (e.g., left temple arm 125) and the second component 315 may be a frame of a set of eyeglasses 100, as described above in relation to FIG. 1A. As such, FIG. 3A would be an isometric view from the right of the hinge mechanism 105a (looking away from the rest of the set of eyeglasses 100). In alternative embodiments, the first component 310 and the second component 315 can be portions of another hinged electronic device. For instance, the first component 310 can be a watch strap and the second component 315 can be a face of a watch.

Figure 3B:
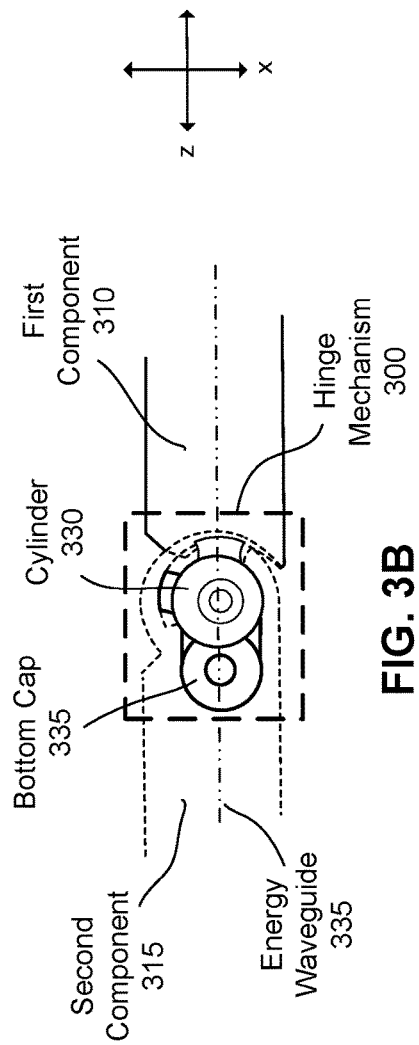
FIG. 3B is a second view of a portion of the hinged electronic device that includes the hinge mechanism of FIG. 3A in a first rotational position, according to one or more embodiments.

FIG. 3B shows a second view of a portion of the hinged electronic device that includes the hinge mechanism 300 of FIG. 3A in the first rotational position, according to one or more embodiments. In the embodiment of FIG. 3B, the cylinder 330 is manufactured as a continuum of the first component 310. Alternatively, the cylinder 330 may be mounted to the first component 310 by an adhesive or a fastener. In other embodiments, the cylinder 330 can be attached to the second component 315 instead of the first component 310. Similarly, the bottom cap 335 can be coupled to the first component 310 instead of the second component 315. In some embodiments, the cylinder 330 can be mechanically coupled to the first component 310 and enclosed by the second component 315 such that the cylinder 330 is not visible to a user. Alternatively, the cylinder 330 can be coupled to the first component 310 in any manner (e.g., welded, interlocked, etc.) suitable for operation.

Figure 3C:
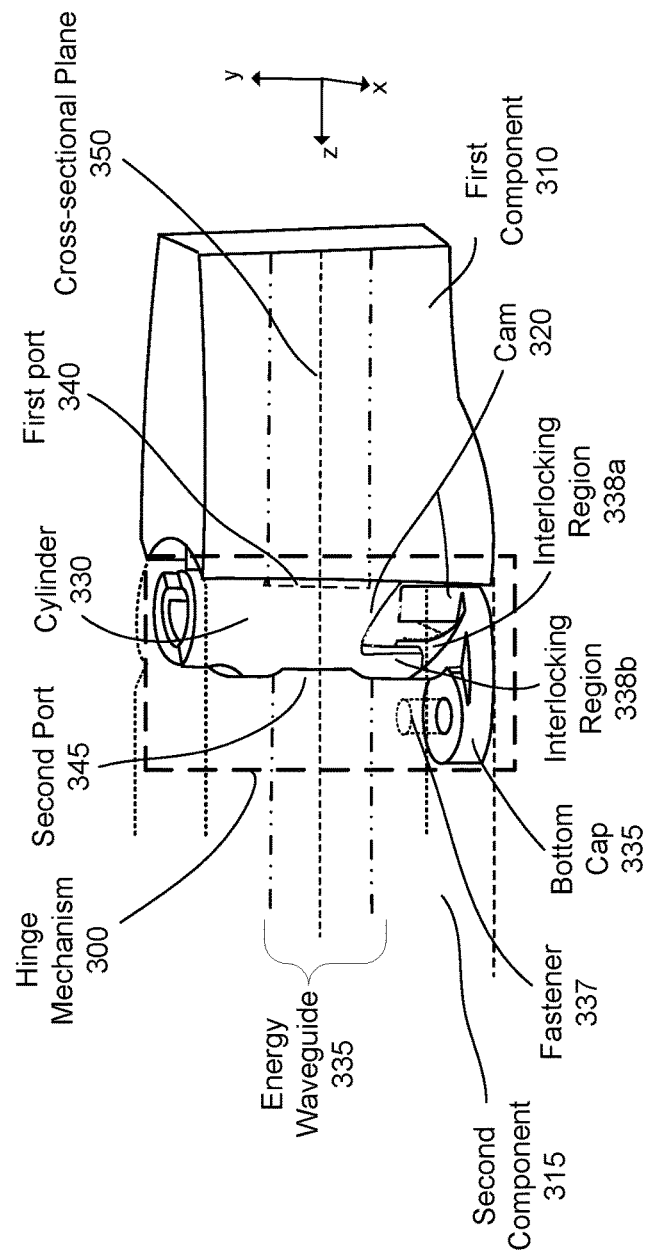
FIG. 3C is a third view of a portion of the hinged electronic device that includes the hinge mechanism of FIG. 3A in a first rotational position, according to one or more embodiments.

FIG. 3C shows a third view of a portion of the hinged electronic device that includes the hinge mechanism 300 of FIG. 3A in the first rotational position, according to one or more embodiments. Shown in FIG. 3C, the bottom cap 335 is shaped so that a portion of the bottom cap 335 can be mounted to the second component 315 by a fastener 337 and another portion (e.g., an interlocking region 338a) of the bottom cap 335 can mate with the cylinder 330. The interlocking region 338a of the bottom cap 335 has a cylindrical shape with the same width as an interlocking region 338b of the cylinder 330. In alternative embodiments, the bottom cap 335 can be any shape suitable for coupling the cylinder 330 and the second component 315. In a first rotational position shown in FIG. 3C, the interlocking region 338a of the bottom cap is not flush with the interlocking region 338b of the cylinder 330 (e.g., the cylinder 330 and the cap 335 are not interlocked). The interlocking region 338a of the bottom cap 335 and the interlocking region 338b of the cylinder 330 are offset such that the energy waveguide 335 maintains a level position in a cross-sectional plane 350 of an axis parallel to an axis of rotation in a first rotational position. As such, the first port 340 and the second port 345 are also level in the cross-sectional plane 350. In a second rotational position, the interlocking region 338a of the bottom cap 335 and the interlocking region 338b of the cylinder 330 are mated as described below in relation to FIG. 5A.

In the embodiment of FIG. 3C, the first component 310 may be a left temple arm and the second component 315 may be a frame of a set of eyeglasses 100, as described above in relation to FIG. 1A. As such, FIG. 3B is an isometric view from the left of the hinge mechanism 105a (looking towards the rest of the set of eyeglasses 100). In alternative embodiments, the first component 310 and the second component 315 can be portions of a hinged electronic device. For instance, the first component 310 can be a keyboard and the second component 315 can be a display.

Figure 4A:
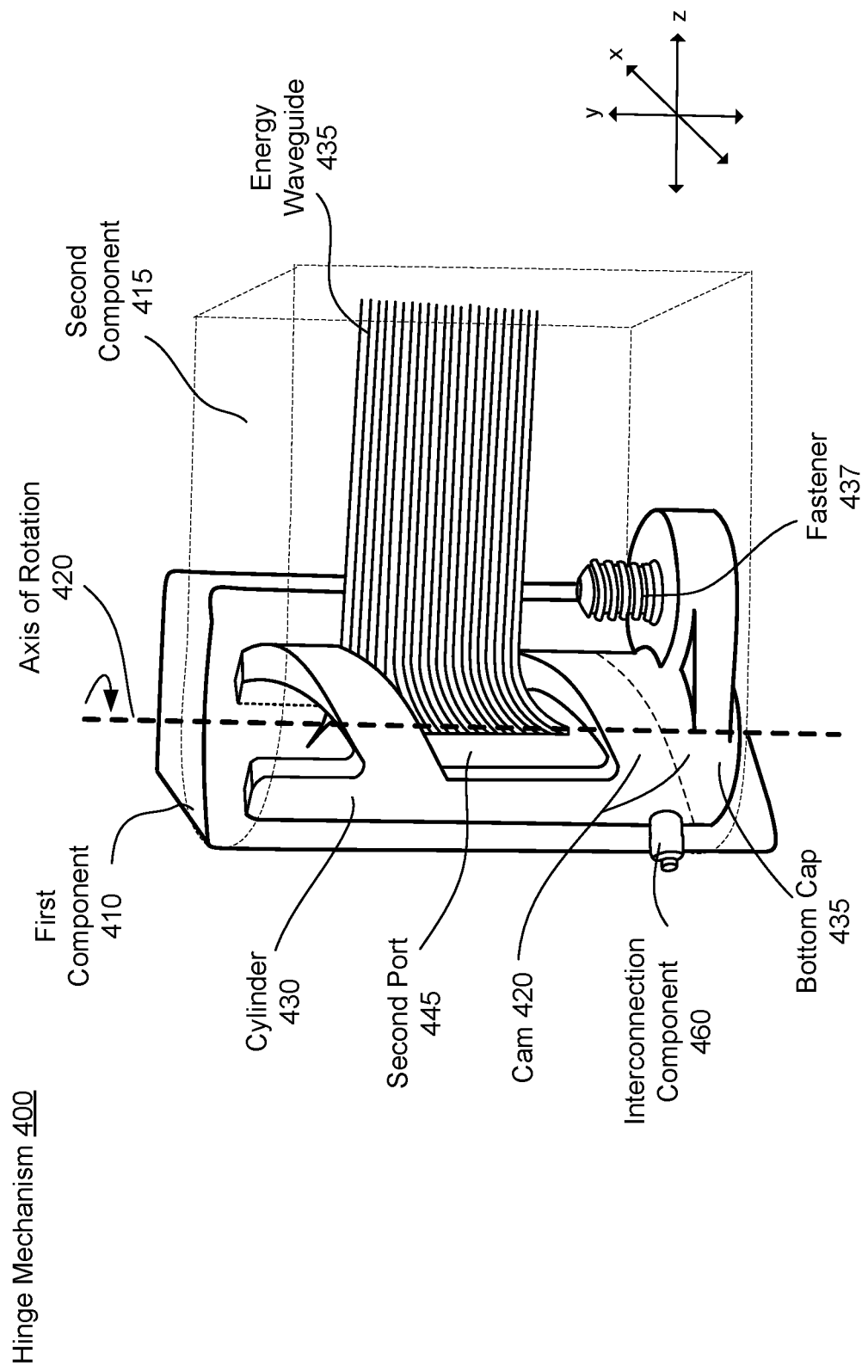
FIG. 4A is an isometric view of a hinge mechanism in a second rotational position, according to one or more embodiments.

FIG. 4A is an isometric view of a hinge mechanism 400 in a second rotational position, according to one or more embodiments. The hinge mechanism 400 is substantially the same as the hinge mechanism 300, except that it is modified such that a direction of rotation about an axis of rotation 420 is opposite that of the hinge mechanism 300 to cause an offset in a (e.g., along an axis parallel to the y-axis) between a first component 410 and a second component 415. The hinge mechanism 400 includes a cam 420 and mounting components to couple a first component 410 and a second component 415. Some embodiments of the hinge mechanism 400 have different components than those described here. Similarly, the functions can be distributed among the components in a different manner than is described here.

In the embodiment of FIG. 4A, the axis of rotation 420 is parallel to the y-axis and vertical translation of the first component 410 occurs along the axis of rotation 420. In the embodiment of FIG. 4A, the first component 410 extends into the page. In one embodiment, the rotation angle of the first component 410 relative to the second component 415 about the axis of rotation 420 (e.g., in the z-x plane) is less than 140 degrees. The rotation angle about the axis of rotation 420 can be limited by design properties (e.g., material of the energy waveguide 435, size of the first port 440 and/or the second port 445). In other embodiments, the rotation angle about the axis of rotation 420 may be greater or less than 140 degrees. The axis of rotation 420 is substantially the same as the axis of rotation 320, except the first component 410 is configured to rotate in a direction about the axis of rotation 420 opposite to the direction of the first component 410 about the axis of rotation 320. Accordingly, for opposite respective directions of rotation cause the first component 410 and the first component 310 translate in the same direction along an axis parallel the y-axis.

The cam 420 includes a cylinder 430 and a bottom cap 435. The cam 320 is coupled to the first component 410 and the bottom cap 435 is coupled to the second component 415 using a fastener 437. The cylinder 430 includes a first port (shown in FIG. 4B) and a second port 445. An energy waveguide 335 pass through the cylinder 430 via the first port and the second port 445. The cam 420, the cylinder 430, the bottom cap 435, the fastener 430 the first port, the second port, and the energy waveguide, are substantially the same as the cam 320, the cylinder 330, the bottom cap 335, the fastener 337, the first port 340, the second port 345, the energy waveguide 335, respectively, except that at least some of the components have been modified such that a direction of rotation about the axis of rotation 420 is opposite that of the hinge mechanism 300 to cause an offset in a (e.g., along an axis parallel to the y-axis) between a first component 410 and a second component 415.

The hinge mechanism 400 may include one or more interconnection components. The hinge mechanism 400 in FIG. 4A includes an interconnection component 460. The interconnection component 460 can electrically couple an electrical device in the first component 410 to an electrical device in the second component 415 in a first rotational position. In one embodiment, the interconnection component 460 functions as an automatic power switch (e.g., a hinged electronic device is on in a first rotational position and the hinged electronic device is off in a second rotational position). The physical connection formed by the interconnection component 460 and the second component 415 in a first rotational position is broken in a second rotational position, thus other connections (e.g., electronic) are also broken. In the second rotational position, the interconnection component 460 is exposed and the interconnection component 460 is coupled to an electrical device (e.g., electrical devices 140a described in relation to FIG. 1A) in the second component 415. In a first rotational position, the interconnection component 460 is coupled to an electrical device (e.g. electrical device 142a) in the first component 410 and an electrical device (e.g., electrical devices 140a) in the second component 415. Alternatively, the interconnection component 460 can be configured to have a variety of functions in different hinged electronic devices (e.g., a pair of eyeglasses, a laptop, a cell phone).

In one embodiment, the interconnection component 460 is a connection device such as a spring-loaded contact or a spring finger array used to establish a temporary electronic connection. In the embodiment of FIG. 4A, the interconnection component 460 is a pogo pin configured to establish a temporary connection between printed circuit boards (PCB) in the first component 410 and the second component 415. A pogo pin includes a cylinder and a spring-loaded pin. A pogo pin can provide advantages such as design flexibility, easy maintenance, and a relatively long lifetime. In another embodiment, the interconnection component 460 is a spring finger array. A spring finger array provides a single contact surface that can function to connect a portion of an electronic device in the first component 410 or the second component 415 and a PCB in the first component 410 or the second component 415. A spring finger array can be particularly useful for a set of eyeglasses (e.g., eyeglasses 100).

Figure 4B:
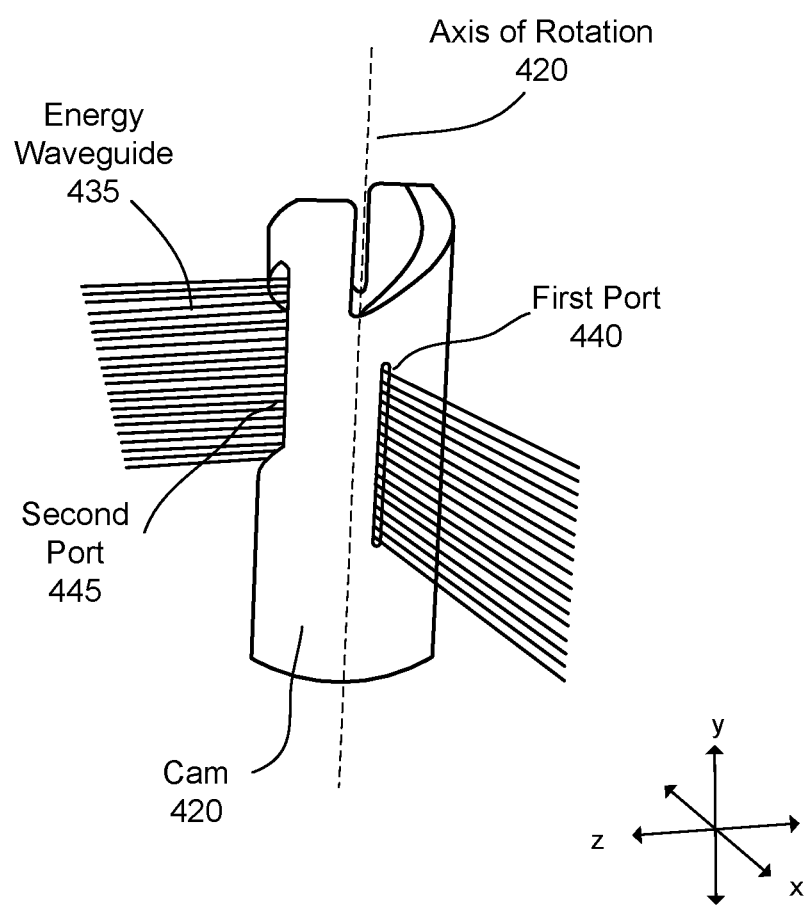
FIG. 4B shows an isometric view from a back of a cam of FIG. 4A, according to one or more embodiments.
Figure 5A:
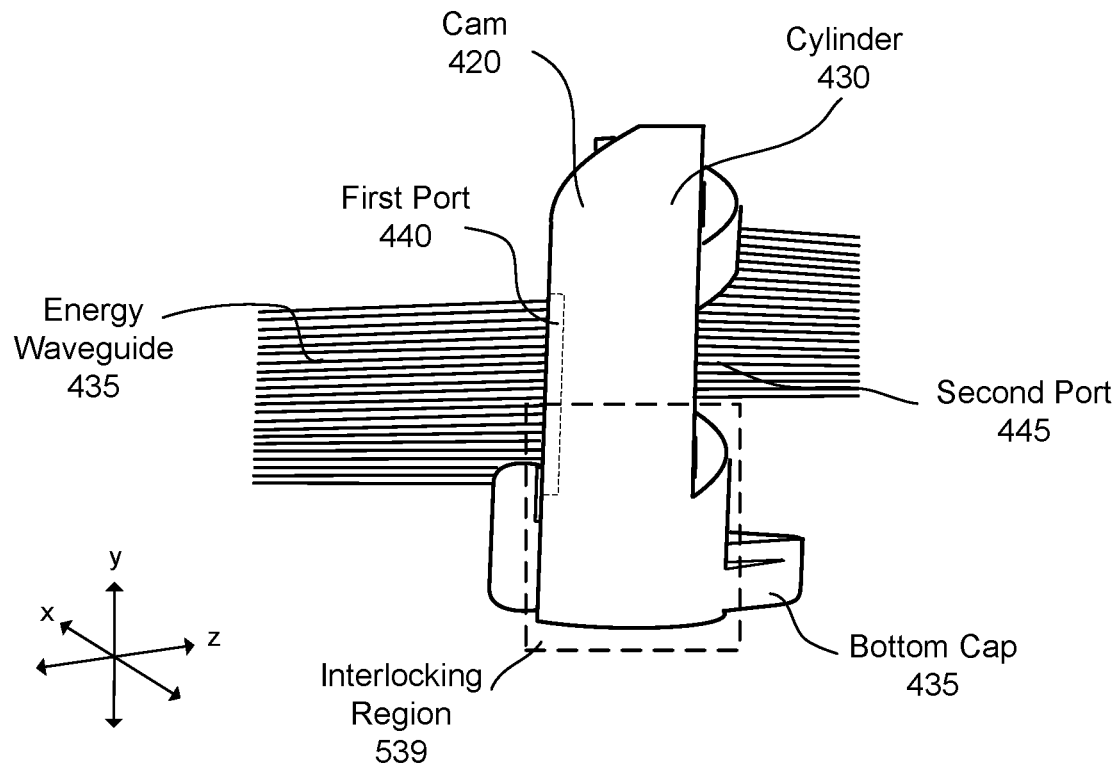
FIG. 5A is an isometric view from the back right of a cam in a second rotational position, according to one or more embodiments.
Figure 5B:
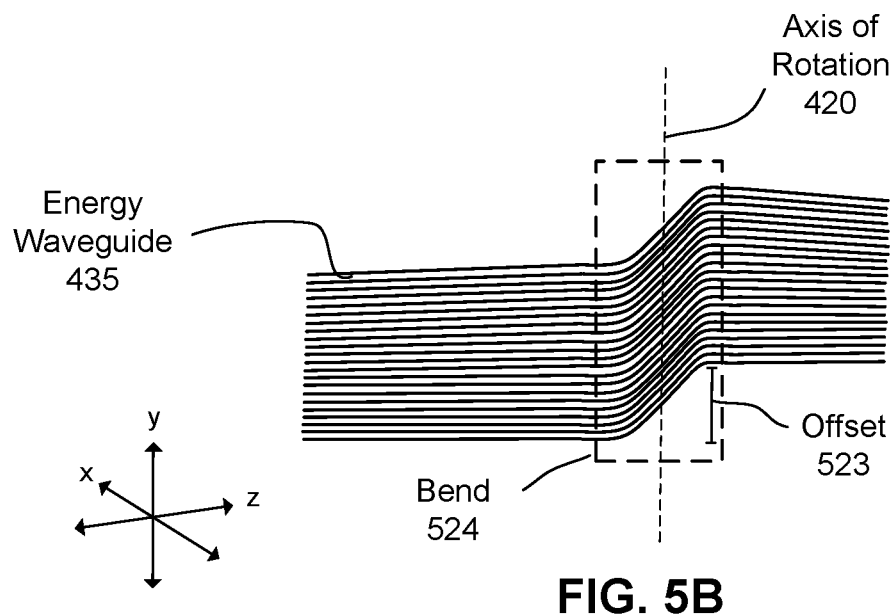
FIG. 5B shows an energy waveguide of FIG. 5A, in accordance with one or more embodiments.

FIG. 4B shows an isometric view from a cam 420 of FIG. 4, according to one or more embodiments. The energy waveguide 435 passes from a first component (e.g., the first component 410) into the first port 440 and through the second port 445 into a second component (e.g., the second component 415). The first port 440 has a constant cross section so that the energy waveguide 435 is approximately tangent to a bend (e.g., as shown in FIG. 5A-B), at the first port 440. In the embodiment of FIG. 4B, first port 440 has a rectangular cross section for supporting an energy waveguide 435 with a similar cross section. In alternative embodiments, the first port 440 may have a different cross-sectional shape. The second port 445 has a variable cross section as described above in relation to FIG. 3A so that the energy waveguide 435 is also approximately tangent to a bend at the second port 445. The tangency of the energy waveguide 435 to the bend, described in greater detail in relation to FIG. 5B, at the ports prevents the energy waveguide 435 from bending in undesired directions.

FIG. 5A shows a first view of the cam 420 of FIG. 4A in the second rotational position, according to one or more embodiments. In the second rotational position, the cylinder 430 and the bottom cap 435 are interlocked at an interlocking region 539 such that the energy waveguide 435 does not exceed the minimum bend radius. The interlocking region 439 is the area of interaction between the interlocking region 438b of the cylinder 430 and the interlocking region 438a of bottom cap 435 as described above in relation to FIG. 3C. The interlocking region 439 prevents undesired rotation of the cylinder 430 relative to the bottom cap 335.

FIG. 5B shows the energy waveguide 435 of FIG. 5A, in accordance with one or more embodiments. In FIG. 5B, the y-axis is parallel with the axis of rotation 420. Translational motion of the energy waveguide 435 occurs in the y-direction and rotational motion occurs in an x-z plane. The translational and rotational motion displacement is guided by the first port and the second port of the cylinder. An offset 523 is shown along an axis parallel to the axis of rotation 420. The portion of the energy waveguide 435 to the right of the axis of rotation 420 extends into the page at an angle. Without a bend 524, shown by a dashed line, the portion of the energy waveguide 435 to the left of the axis of rotation 420 and the portion of the energy waveguide 435 to the right of the axis of rotation would intersect at approximately a right angle. The three-dimensional bend 524 and offset 523 prevent the energy waveguide 435 from this type of undesired sharp bending. The edges of the bend 524 that are parallel to the axis of rotation 420 are the regions of tangency described above in relation to FIG. 4B.

The offset 523 allows the energy waveguide 435 to maintain a consistent length across the bend 524 during rotation without breaking tangency to the bend angle at the regions of tangency and without introducing an additional bend radius. The offset 523 is controlled by a minimum bend radius. The minimum bend radius is the minimum radius that an energy waveguide can bend without damaging it and/or decreasing its lifetime below a threshold amount (note in some embodiments it may be an infinite life part). For instance, an energy waveguide with a minimum bend radius of 2 millimeters has an offset 523 distance of 1.75 millimeters at a 90-degree angle of rotation in order to maintain tangency along the edges of the bend 524 that are parallel to the axis of rotation 420 without introducing an additional bend radii. In alternative embodiments, the hinge mechanism can have a larger or smaller offset depending on the requirements of the system (e.g., the offset is larger for a larger minimum bend radius). A diameter of the energy waveguide 435 can affect the minimum bend radius, thus the offset 523 is also dependent on the diameter of the energy waveguide 435.

Energy Waveguide

Figure 6:
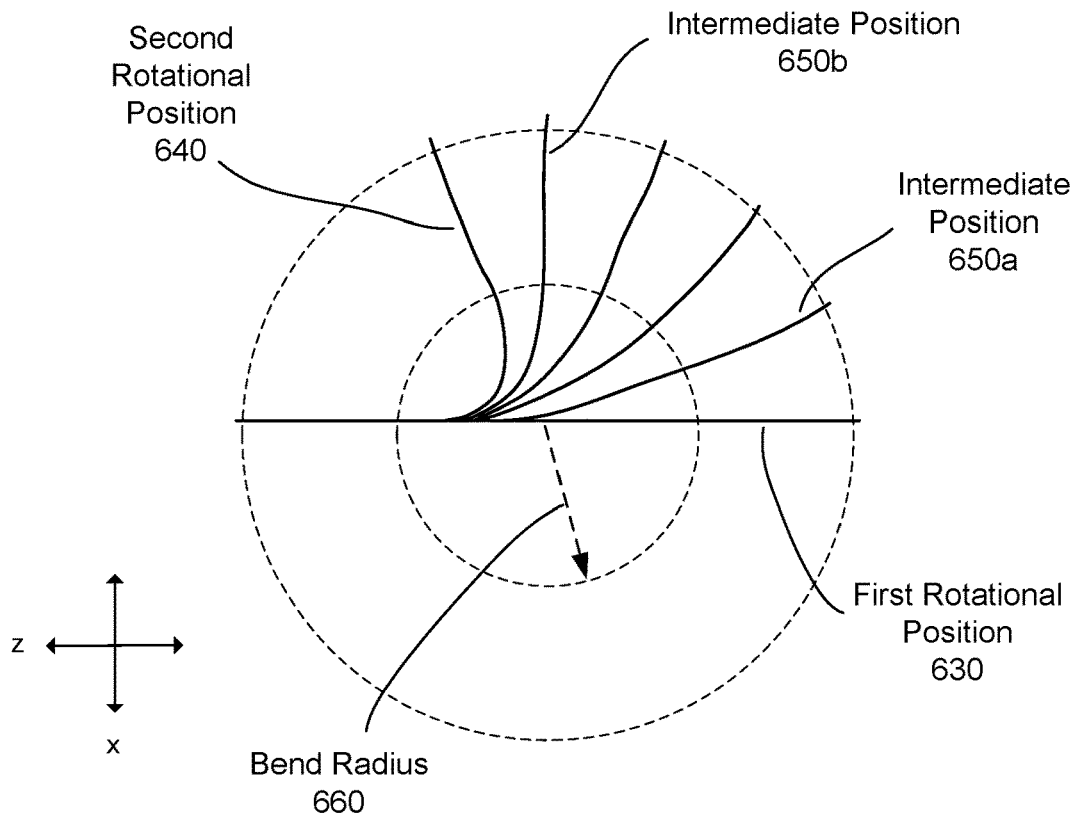
FIG. 6 shows a top view and a side view of an energy waveguide as it moves from a first rotational position to a second rotational position within a hinge mechanism, according to one or more embodiments.
Figure 6:
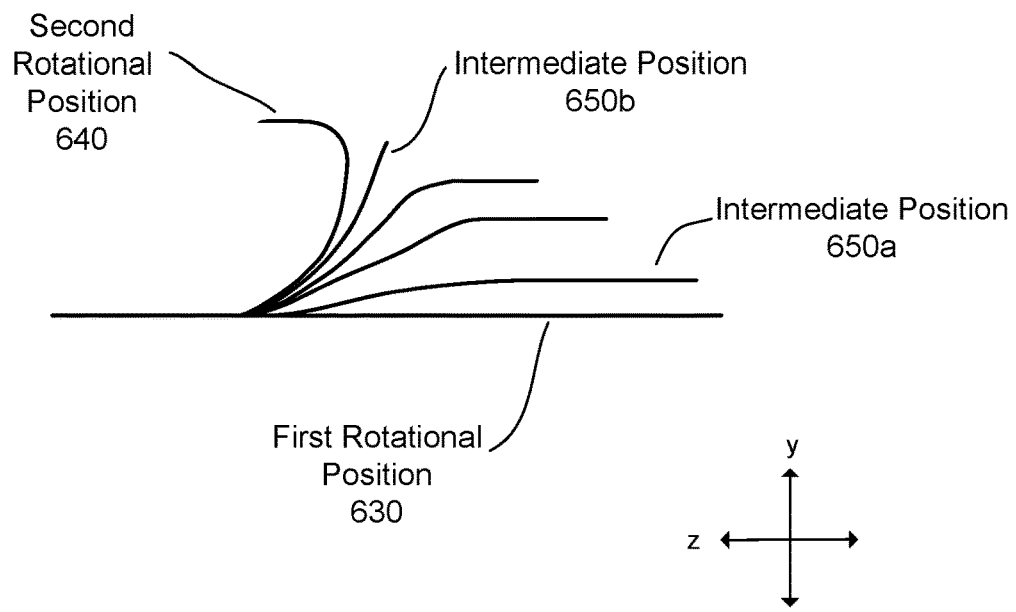

FIG. 6 shows a top view 605 and a side view 610 of an energy waveguide (e.g., 135a, 335) as it moves from a first rotational position 630 to a second rotational position 640 within a hinge mechanism, according to one or more embodiments. The top view 605 illustrates the movement of the energy waveguide in a z-x plane, where the y-axis is coming out of the page, from a first rotational position 630, where the energy waveguide is parallel to z-axis, to a second rotational position 640. The top view 605 illustrates motion in the x-direction and the z-direction. Intermediate positions (e.g., 650a, 650b) are shown as the energy waveguide changes rotational positions. Intermediate position 650a shows the energy waveguide with a slight bend such that the angle of rotation is less than 45 degrees. At intermediate position 650b, the energy waveguide is at approximately a 90-degree bend. The top view 605 also shows a bend radius 660. Note that at 90 degrees the actual bend radius is relatively large, as the bending gradually occurs over a length of the energy waveguide not only in the x-z plane but also in a third dimension, y. The second rotational position 640 has an angle of approximately 110-140 degrees. In a device, such as a set of eyeglasses 100, the second rotational position 640 illustrates a closed position configured for compact storage of eyeglasses 100.

The side view 610 illustrates the movement of the energy waveguide in the z-y plane, where the y-axis is coming out of the page, from a first rotational position 630, where the energy waveguide is parallel to the z-axis, to a second rotational position 640. The side view 610 illustrates motion in the z-direction and the y-direction corresponding to the motion described by the top view 605. In the intermediate position 650a, the energy waveguide is slightly bent such that it is slightly offset along an axis parallel to the y-axis. In one embodiment, the y-axis is parallel to the axis of rotation. In intermediate position 650b the energy waveguide has a more significant bend. The energy waveguide is extending into the page in intermediate position 650b, illustrating the three-dimensional motion of the energy waveguide.

The top view 605 and the side view 610 of FIG. 6 illustrate movement of the energy waveguide in three directions (e.g., x, y and z directions) such that the energy waveguide translates along one axis while rotating about an orthogonal axis and thereby mitigates the energy waveguide from being subjected to a large amount of bending over a very small section of the energy waveguide. In contrast, conventional hinges with in-line conductors bend the conductors in a single plain with no translation, thereby forming a sharp angle (e.g., a 90-degree angle) over a very small section of the conductor (i.e., a bend radius of a conventional hinged system is <<than the bend radius 660). And this section of the conductor can become a point of failure due to stresses caused by such a large amount of bending over the small section of the conductor. The sharp angle can have a negative impact on the energy waveguide, such as reduced lifetime or reduced functionality. A common solution to avoiding an infinitesimally small hinge bend radius is to include a service loop in a hinge mechanism. A service loop is undesirable because it takes up a significant amount of space, and it introduces a minimum of two additional bend radii, which can negatively affect the lifetime of an energy waveguide.

Another advantage of the hinge mechanism is that it can support energy waveguides that are thicker than those of conventional hinged systems (i.e., rotate but do not translate) for a similar range of rotation without introducing additional bend radii. In general, the hinge mechanism described above may be more reliable than a conventional hinge mechanism. Due to a conventional hinged system rotating in a single plane, in order to achieve a smaller bend radius the conventional hinged system generally is restricted in width of a conductor (i.e., a smaller wire/thinner MCX is used) or a service loop is added, which increases the space occupied by the hinged system. The service loop also introduces additional bend radii which can be difficult to control and can result in a loss of reliability. In contrast, the rotation and translation of the hinge mechanism allow for a larger energy waveguide to have a similar range of motion to a range of motion of thinner energy waveguide without introducing additional bend radii and/or a service loop. In some embodiments, a thicker energy waveguide may have a larger offset than a thinner energy waveguide.

The energy waveguide is composed of a material suitable for bending in multiple directions, as described by FIG. 6. The energy waveguide can be composed of a single material or a composite material to provide suitable physical properties for maintaining its shape and functionality when moving from a first rotational position to a second rotational position. The energy waveguide can have material properties (e.g., flexibility, durability) that allow for rotational and translational movement.

In relation to mechanical properties, the energy waveguide can have a compressive strength, a shear strength, a tensile strength, a strength in bending, an elastic modulus, a hardness, a derivative of the above mechanical properties and/or other properties to enable the energy waveguide to withstand a large number of cycles of rotation. The energy waveguide is subjected to bending, shear and tensile forces under rotational and translational motion. In one embodiment, the energy waveguide can be composed of a material that can survive 75,000 cycles in a hinge mechanism without breaking or deforming. The energy waveguide can have an elastic modulus appropriate to maintain its shape as it moves from a first rotational position to a second rotational position.

In relation to electrical properties, the material(s) of the energy waveguide can have a conductivity, resistivity, a derivative of the above electrical properties and/or other properties that support electrical signal transmission from a portion of an electrical device in a first component to a portion of an electrical device in a second component as described in relation to FIG. 1A. The energy waveguide can be electrically conductive in order to couple portions of an electrical device (e.g., a battery, a microphone, a speaker). In one embodiment, an energy waveguide (e.g., 135a, 135b) can be a conductive wire or an array of conductive wires. The energy waveguide can be composed of a variety of conductive materials, including polymers, composites, and metals (e.g., glass, copper, aluminum, etc.). In some embodiments, the energy waveguide may be a micro coax (MCX) cable. In the embodiment of a set of eyeglasses 100 described in relation to FIG. 1A-1B, an MCX cable can have a small outer diameter such as a 0.36 or 0.22 millimeter diameter. In alternative embodiments, the MCX cable can have any suitable diameter. The energy waveguide can also include of an array of MCX cables.

The energy waveguide can be an optical fiber or optical fiber array. In some embodiments, the optical fiber may have an outer diameter of 0.242 millimeters. In alternative embodiments, an optical fiber can have any suitable diameter. In other embodiments, various types of energy waveguides can be implemented according to design requirements (e.g., manufacturing considerations, cost considerations, size requirements, etc.).

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The invention claimed is:

1. An assembly comprising:
   a hinge mechanism that couples a first component to a second component, the hinge mechanism including an axis of rotation about which the first component rotates relative to the second component, the hinge mechanism comprising:
   a cam coupled to the first component, the cam comprising a first port and a second port, and the relative position of the first port to the second port translates parallel to the axis of rotation as the first port rotates relative to the second port about the axis of rotation, wherein an energy waveguide passes through the first component into the first port and out of the second port into the second component.

2. The assembly of claim 1, wherein in a first rotational position of the hinge mechanism, the first port and the second port are level in a cross-sectional plane of the axis of rotation.

3. The assembly of claim 2, wherein in a second rotational position of the hinge mechanism, the first port and the second port are offset relative to each other, and the offset includes a translation along an axis parallel to the axis of rotation and a rotation about the axis of rotation.

4. The assembly of claim 3, further comprising an electrical charging region wherein the electrical charging region is hidden in the first rotational position and exposed in the second rotational position.

5. The assembly of claim 3, wherein the rotation about the axis of rotation is less than 140 degrees.

6. The assembly of claim 2, further comprising an interconnection component configured to electrically couple to a portion of an electrical device in the first component with a portion of an electrical device in the second component in the first rotational position.

7. The assembly of claim 6, wherein the interconnection component is selected from a group consisting of: a pogo pin and a spring finger array.

8. The assembly of claim 1, wherein the first component and the second component are portions of a set of eyeglasses.

9. The assembly of claim 1, wherein the energy waveguide is conductive and electrically couples different portions of an electronic device.

10. The electronic device of claim 9, wherein the electronic device is selected from a group consisting of: a laptop, a phone, a watch, a bracelet, a near-eye display, and a hinged electronic device.

11. The assembly of claim 1, wherein the energy waveguide is selected from a group consisting of: a micro coax array, and an optical fiber array.

12. The assembly of claim 1, wherein the cam comprises a cylinder coupled to the first component and a cap coupled to the second component, wherein the first port and the second port are openings to pass through the cylinder and the energy waveguide passes through the cylinder.

13. An eyeglass assembly comprising:
a frame holding at least one optical element;
a temple arm;
a hinge mechanism that couples the temple arm to the frame, the hinge mechanism including an axis of rotation about which the temple arm rotates relative to the frame, the hinge mechanism comprising;
a cam coupled to the temple arm, the cam comprising a first port and a second port, and the relative position of the first port to the second port translates parallel to the axis of rotation as the first port rotates relative to the second port about the axis of rotation,
wherein a wire passes through the temple arm into the first port and out of the second port into the front frame.

14. The assembly of claim 13, wherein in a first rotational position of the hinge mechanism, the first port and the second port are level in a cross-sectional plane of the axis of rotation.

15. The assembly of claim 14, wherein in a second rotational position of the hinge mechanism, the first port and the second port are offset relative to each other, and the offset includes a translation along an axis parallel to the axis of rotation and a rotation about the axis of rotation.

16. The assembly of claim 15, further comprising an electrical charging region wherein the electrical charging region is hidden in the first rotational position and exposed in the second rotational position.

17. The assembly of claim 15, wherein the rotation about the axis of rotation is less than 140 degrees.

18. The assembly of claim 14, further comprising an interconnection component electrically coupled to a portion of an electrical device in the temple arm and a portion of an electrical device in the frame in a first rotational position, wherein the interconnection component is selected from a group consisting of: a pogo pin and a spring finger array.

19. The assembly of claim 13, wherein the wire is selected from a group consisting of: a micro coax array and an optical fiber array.

20. The assembly of claim 13, wherein the cam comprises a cylinder coupled to the temple arm and a cap coupled to the frame, wherein the first port and the second port are openings to pass through the cylinder and the wire passes through the cylinder.

* * * * *

UNITED STATES PATENT AND TRADEMARK OFFICE
CERTIFICATE OF CORRECTION

| | | |
|---|---|---|
| PATENT NO. | : 11,340,476 B1 | Page 1 of 1 |
| APPLICATION NO. | : 16/222315 | |
| DATED | : May 24, 2022 | |
| INVENTOR(S) | : Aaron Bobuk | |

It is certified that error appears in the above-identified patent and that said Letters Patent is hereby corrected as shown below:

In the Claims

In Column 17, Claim 13, Line 35, delete "comprising;" and insert -- comprising: --, therefor.

Signed and Sealed this
Thirtieth Day of August, 2022

Katherine Kelly Vidal
Director of the United States Patent and Trademark Office